(12) United States Patent
Saito et al.

(10) Patent No.: US 11,742,492 B2
(45) Date of Patent: Aug. 29, 2023

(54) SECONDARY BATTERY POSITIVE ELECTRODE, SECONDARY BATTERY POSITIVE ELECTRODE CURRENT COLLECTOR, AND SECONDARY BATTERY

(71) Applicant: Panasonic Intellectual Property Management Co., Ltd., Osaka (JP)

(72) Inventors: Kohei Saito, Osaka (JP); Takahiro Takahashi, Osaka (JP); Hideharu Takezawa, Nara (JP); Tomoki Shiozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 16/977,579

(22) PCT Filed: Jan. 15, 2019

(86) PCT No.: PCT/JP2019/000823
§ 371 (c)(1),
(2) Date: Sep. 2, 2020

(87) PCT Pub. No.: WO2019/171761
PCT Pub. Date: Sep. 12, 2019

(65) Prior Publication Data
US 2021/0013516 A1    Jan. 14, 2021

(30) Foreign Application Priority Data
Mar. 9, 2018    (JP) ................. 2018-043322

(51) Int. Cl.
*H01M 4/66*    (2006.01)
*H01M 4/62*    (2006.01)
(Continued)

(52) U.S. Cl.
CPC ............ *H01M 4/667* (2013.01); *H01M 4/362* (2013.01); *H01M 4/624* (2013.01); *H01M 4/666* (2013.01);
(Continued)

(58) Field of Classification Search
CPC .......... H01M 4/66; H01M 4/60; H01M 50/10; H01M 50/20; H01M 4/34
See application file for complete search history.

(56) References Cited

U.S. PATENT DOCUMENTS

2012/0034521 A1\* 2/2012 Matsuyama .......... H01M 4/661
429/211
2015/0303484 A1 10/2015 Iida et al.
(Continued)

FOREIGN PATENT DOCUMENTS

CN    104798232 A    7/2015
JP    2016-127000 A    7/2016
(Continued)

OTHER PUBLICATIONS

International Search Report dated Mar. 26, 2019, issued in counterpart Application No. PCT/JP2019/000823. (2 pages).
(Continued)

*Primary Examiner* — Kenneth J Douyette
(74) *Attorney, Agent, or Firm* — WHDA, LLP

(57) ABSTRACT

This positive electrode includes: a positive electrode current collector; a positive electrode mixed material layer that is formed on at least one surface of the positive electrode current collector; and a protective layer which includes an insulating inorganic compound and a conductive material, and is interposed between the positive electrode current collector and the positive electrode mixed material layer. The protective layer includes secondary particles comprising agglomerated primary particles of the inorganic com-
(Continued)

pound. The median value of the particle size of the secondary particles is 30 μm or less.

11 Claims, 2 Drawing Sheets

(51) Int. Cl.
*H01M 4/36* (2006.01)
*H01M 4/02* (2006.01)

(52) U.S. Cl.
CPC ................ *H01M 2004/021* (2013.01); *H01M 2004/028* (2013.01)

(56) References Cited

U.S. PATENT DOCUMENTS

| | | |
|---|---|---|
| 2016/0042878 A1 | 2/2016 | Kato et al. |
| 2016/0190566 A1* | 6/2016 | Shiozaki ............... H01M 4/661 429/231.1 |
| 2018/0026301 A1 | 1/2018 | Ebisuzaki et al. |

FOREIGN PATENT DOCUMENTS

| | | |
|---|---|---|
| JP | 2018-14286 A | 1/2018 |
| WO | 2014/077384 A1 | 5/2014 |
| WO | 2014/157405 A1 | 10/2014 |

OTHER PUBLICATIONS

English Translation of Chinese Search Report dated Oct. 21, 2022 for the related Chinese Patent Application No. 201980010637.X.

* cited by examiner

SECONDARY BATTERY POSITIVE ELECTRODE, SECONDARY BATTERY POSITIVE ELECTRODE CURRENT COLLECTOR, AND SECONDARY BATTERY

TECHNICAL FIELD

The present disclosure relates to a positive electrode for a secondary battery, a positive electrode current collector for a secondary battery, and a secondary battery.

BACKGROUND ART

There have been conventionally known positive electrodes for secondary batteries in which a protective layer including inorganic compound particles is formed between a current collector and a mixture layer. For example, Patent Literature 1 discloses a positive electrode having a thickness of 1 μm to 5 μm and comprising a protective layer that includes an inorganic compound having a lower oxidizing ability than that of a lithium metal composite oxide as the positive electrode active material, and a conductive agent. Patent Literature 1 mentions that heat generation due to a redox reaction between the positive electrode active material and the aluminum current collector can be suppressed while a good current collectability is maintained.

CITATION LIST

Patent Literature

PATENT LITERATURE 1: Japanese Unexamined Patent Application Publication No. 2016-127000

SUMMARY

Incidentally, when an abnormality such as an internal short circuit occurs in secondary batteries such as lithium ion batteries, suppressing heat generation is an important issue. For example, it is desirable that a heat generation suppressing effect be obtained homogeneously in the entire positive electrode and that the amount of heat generated be sufficiently reduced even when an abnormality such as an internal short circuit occurs.

A positive electrode for a secondary battery according to one aspect of the present disclosure comprises a positive electrode current collector, a positive electrode mixture layer formed on at least one side of the positive electrode current collector, and a protective layer including an insulating inorganic compound and a conductive agent, the protective layer being interposed between the positive electrode current collector and the positive electrode mixture layer. The protective layer includes secondary particles formed by aggregation of primary particles of the inorganic compound, and the median value of the particle size of the secondary particles is 30 μm or less.

A positive electrode current collector for a secondary battery according to one aspect of the present disclosure is a positive electrode current collector for a secondary battery, the positive electrode current collector comprising a protective layer formed on the surface of thereof, and the protective layer includes an insulating inorganic compound and a conductive agent. The protective layer includes secondary particles formed by aggregation of primary particles of the inorganic compound, and the median value of the particle size of the secondary particles is 30 μm or less.

A secondary battery according to one aspect of the present disclosure comprises the positive electrode described above, a negative electrode, and an electrolyte.

According to the positive electrode for a secondary battery according to one aspect of the present disclosure, heat generation when an abnormality such as an internal short circuit occurs may be suppressed.

DESCRIPTION OF EMBODIMENTS

As mentioned above, when an internal short circuit of a battery occurs, suppressing heat generation is an important issue. The present inventors have intensively studied with focusing on a protective layer interposed between a positive electrode current collector and a positive electrode mixture layer and, as a result, found that such heat generation is specifically suppressed by use of a protective layer including secondary particles of an inorganic compound having a median value of the particle size of 30 μm or less. Particularly, when the median value of the particle size of the secondary particles of the inorganic compound is 20 μm or less, a more remarkable heat generation suppressing effect can be achieved.

It is considered that if aggregation of the primary particles of the inorganic compound proceeds to result in an excessively large particle size of the secondary particles, the amount of the inorganic compound decreases in a portion where secondary particles are not present and that thus the functions of the protective layer may not be sufficiently exerted. It is assumed that a protective layer in which the inorganic compound is uniformly present in a wide area of the layer with a high degree of dispersion of the inorganic compound can be obtained by controlling the median value of the particle size of the secondary particles to 30 μm or less, and it is considered that an excellent heat generation suppressing effect can thus be achieved. The particles of the conductive agent are likely to be in contact with one another on the surface or in the proximity of the secondary particles of the inorganic compound, and in other words, it is considered that the secondary particles of the inorganic compound contribute to formation of a good conductive path in the protective layer.

One exemplary embodiment will be described in detail below. Hereinafter, a cylindrical battery in which an electrode assembly having a wound structure 14 is housed in a cylindrical battery case is exemplified. The electrode assembly is not limited to the wound type and may be a laminated type formed by alternately laminating a plurality of positive electrodes and a plurality of negative electrodes with separators therebetween. The battery case is not limited to a cylindrical case and may be a metal case of rectangular (rectangular battery), coin-shaped (coin-shaped battery), a resin case composed of a resin film (laminate battery), or the like. An expression "a numerical value (A) to a numerical value (B)" herein means a numerical value (A) or more and a numerical value (B) or less, unless otherwise indicated.

Figure 1:
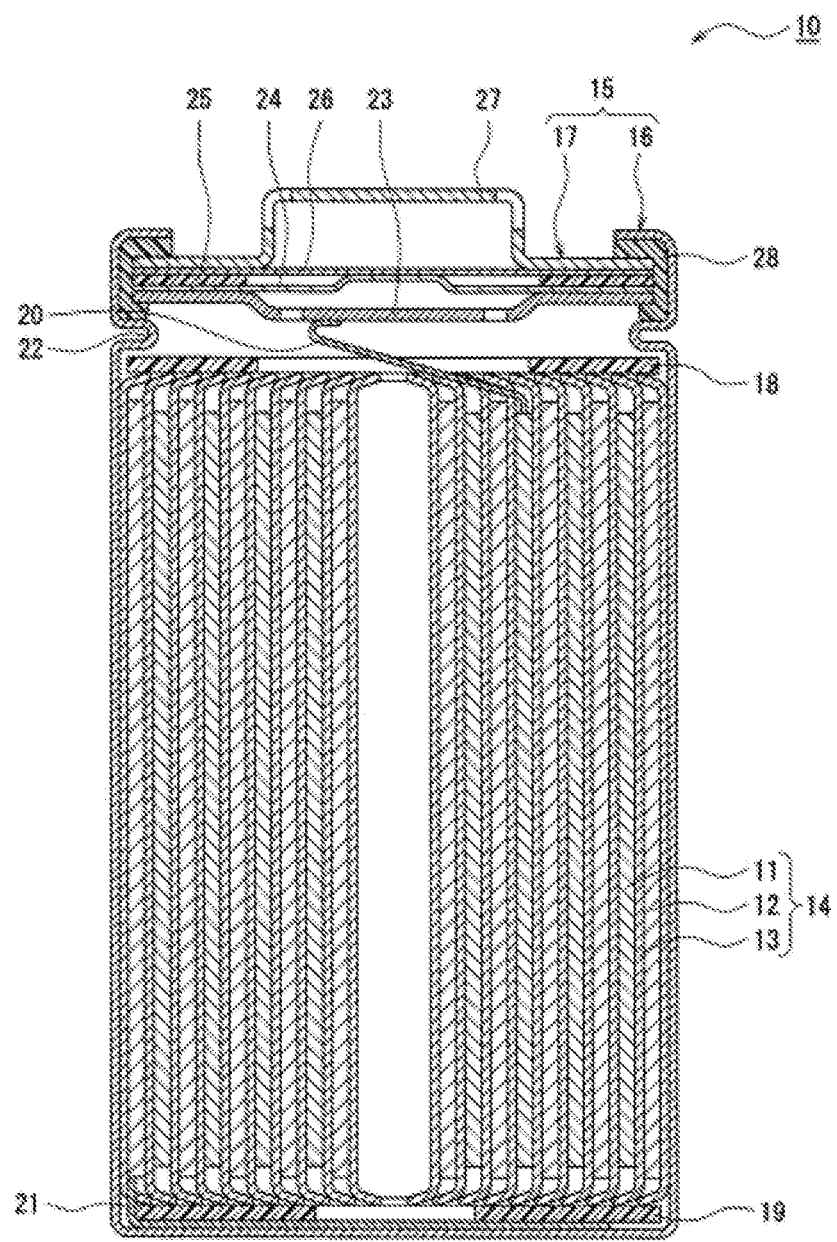
FIG. 1 is a sectional view of a secondary battery as an exemplary embodiment.

FIG. 1 is a sectional view of a secondary battery 10 as an exemplary embodiment. As exemplified in FIG. 1, the secondary battery 10 comprises an electrode assembly 14, an electrolyte (not shown), and a battery case 15 that houses the electrode assembly 14 and the electrolyte. The electrode assembly 14 has a wound structure that comprises a positive electrode 11, a negative electrode 12, and a separator 13, the positive electrode 11 and the negative electrode 12 being wound together with the separator 13 therebetween. The battery case 15 is composed of a bottomed cylindrical exterior can 16 and a sealing assembly 17 blocking the opening of the exterior can 16.

The secondary battery 10 comprises insulating plates 18 and 19 disposed above and under the electrode assembly 14, respectively. In the example shown in FIG. 1, a positive electrode lead 20 attached to the positive electrode 11 extends through a through-hole in the insulating plate 18 to the side of the sealing assembly 17, and a negative electrode lead 21 attached to the negative electrode 12 extends outside the insulating plate 19 to the side of the bottom of the exterior can 16. The positive electrode lead 20 is connected to the lower surface of the filter 23, which is the bottom plate of the sealing assembly 17, by means of welding or the like. A cap 27, which is the top plate of the sealing assembly 17 electrically connected to the filter 23, serves as the positive electrode terminal. The negative electrode lead 21 is connected to the inner surface of the bottom of the exterior can 16 by means of welding or the like, and the exterior can 16 serves as the negative electrode terminal.

The exterior can 16 is, for example, a bottomed cylindrical metal container. A gasket 28 is provided between the exterior can 16 and the sealing assembly 17 to achieve the hermeticity inside the battery. In the exterior can 16, a projecting portion 22 for supporting the sealing assembly 17 is formed by, for example, making the side wall partially project inside. The projecting portion 22 is preferably annularly formed along the peripheral direction of the exterior can 16, supporting the sealing assembly 17 by the upper surface thereof.

The sealing assembly 17 has a structure in which the filter 23, a lower vent member 24, an insulating member 25, an upper vent member 26, and the cap 27 are layered, in the order mentioned, from the side of the electrode assembly 14. The members composing the sealing assembly 17 each have a disk shape or a ring shape, for example, and the members except for the insulating member 25 are each electrically connected to one another. The lower vent member 24 and the upper vent member 26 are connected at each center part thereof to each other, and the insulating member 25 is interposed between the peripheral edges of the vent members. When the internal pressure of the battery rises due to abnormal heat generation, the lower vent member 24 deforms and breaks so as to push up the upper vent member 26 toward the side of the cap 27, and the current path between the lower vent member 24 and the upper vent member 26 is disconnected. When the internal pressure further rises, the upper vent member 26 breaks, and gas is emitted from the opening of the cap 27.

[Positive Electrode]

Figure 2:
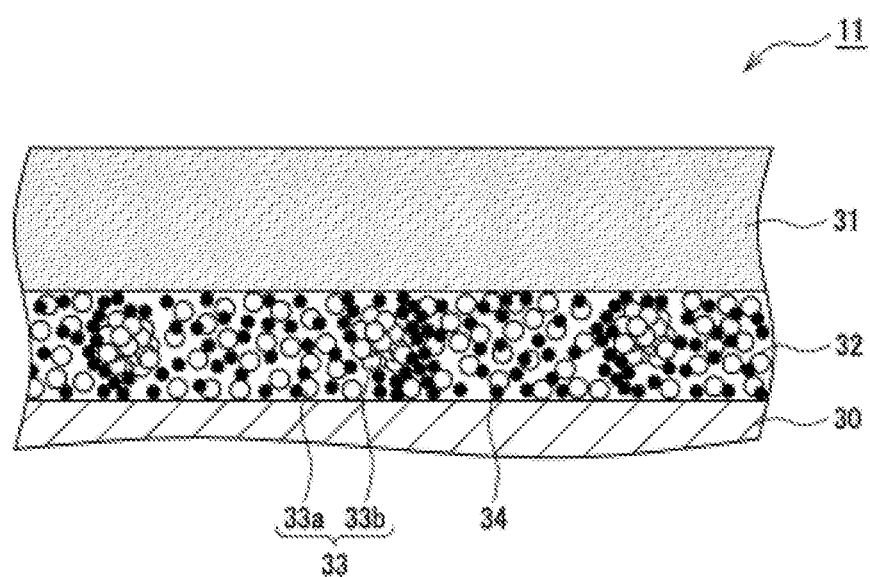
FIG. 2 is a sectional view of a positive electrode for a secondary battery as an exemplary embodiment.

FIG. 2 is a sectional view of a positive electrode 11 as an exemplary embodiment. As exemplified in FIG. 2, the positive electrode 11 comprises a positive electrode current collector 30, a positive electrode mixture layer 31 formed on at least one side of the positive electrode current collector 30, and a protective layer 32 including an insulating inorganic compound 33 and a conductive agent 34, the protective layer 32 being interposed between the positive electrode current collector 30 and the positive electrode mixture layer 31. A foil of a metal that is stable in the electric potential range of the positive electrode 11, such as aluminum, a film with such a metal disposed as an outer layer, and the like can be used for the positive electrode current collector 30. One example of the positive electrode current collector 30 is a metal foil composed of aluminum or an aluminum alloy having a thickness of 10 to 20 µm.

It is preferred that the positive electrode mixture layer 31 include a positive electrode active material, a conductive agent, and a binder and be formed on both sides of the positive electrode current collector 30 with the protective layer 32 therebetween. The positive electrode 11 can be produced by coating the positive electrode current collector 30 having the protective layer 32 formed thereon with a positive electrode mixture slurry including a positive electrode active material, a conductive agent, a binder, and the like, drying the coating, and then rolling the coated current collector to form the positive electrode mixture layer 31 on both sides of the current collector. The thickness of the positive electrode mixture layer 31 is 30 µm to 100 µm, for example, on one side of the positive electrode current collector 30.

Examples of the positive electrode active material include a lithium metal composite oxide containing a metal element such as Co, Mn, Ni, or Al. The metal element constituting the lithium metal composite oxide is at least one selected from Mg, Al, Ca, Sc, Ti, V, Cr, Mn, Fe, Co, Ni, Cu, Zn, Ga, Ge, Y, Zr, Sn, Sb, W, Pb, and Bi, for example. Among these, at least one selected from Co, Ni, Mn, and Al is preferably included. Preferable examples of the lithium metal composite oxide include a lithium metal composite oxide containing Co, Ni, and Mn and a lithium metal composite oxide containing Co, Ni, and Al.

Examples of the conductive agent include carbon materials such as carbon black, acetylene black, Ketjen black, graphite, carbon nanotubes, carbon nanofibers, and graphene. Examples of the binder include fluorine-containing resins such as polytetrafluoroethylene (PTFE) and polyvinylidene fluoride (PVdF), polyacrylonitrile (PAN), polyimide, acrylic resins, and polyolefins. These resins may be combined with carboxymethyl cellulose (CMC) or a salt thereof, polyethylene oxide (PEO), or the like.

The content of the conductive agent in the positive electrode mixture layer 31 is, for example, 0.5 to 15 parts by mass and preferably 1 to 10 parts by mass, based on 100 parts by mass of the positive electrode active material. When the content of the conductive agent is within the range, the good conductivity of the positive electrode mixture layer 31 is easily achieved. The content of the binder in the positive electrode mixture layer 31 is, for example, 0.1 to 10 parts by mass and preferably 0.5 to 5 parts by mass, based on 100 parts by mass of the positive electrode active material. When the content of the binder is within the range, the good binding property among the active material particles, between the active material particles and the conductive agent particles, and between the active material particles and the positive electrode current collector 30 is easily achieved.

The positive electrode 11, as mentioned above, comprises the protective layer 32 provided between the positive electrode current collector 30 and the positive electrode mixture layer 31. The protective layer 32 has a function of, for example, isolating the positive electrode current collector 30 mainly based on aluminum from the lithium metal composite oxide as the positive electrode active material to suppress a redox reaction in which the positive electrode current collector 30 is involved. The protective layer 32 may have higher thermal conductivity than that of the positive electrode mixture layer 31. In this case, when an internal short circuit occurs, the heat generated in the short circuit point is quickly diffused, and an increase in the battery temperature due to expansion of the short circuit area can be prevented.

The protective layer 32 includes the inorganic compound 33, the conductive agent 34, and the binder. The inorganic compound 33 is the major component of the protective layer 32. The heat generation suppressing effect on an occurrence of an abnormality of the battery such as an internal short circuit can be obtained principally due to the function of the inorganic compound 33. The conductive agent 34 imparts conductivity to the protective layer 32 to thereby suppress an increase in the resistance due to provision of the protective layer 32. The binder allows the particles of the inorganic compound 33 and the conductive agent 34 to bind with one another to thereby maintain the shape of the protective layer 32, and additionally causes the protective layer 32 to adhere to the positive electrode current collector 30 and to the positive electrode mixture layer 31 to thereby prevent delamination of the protective layer 32.

As the conductive agent 34, it is possible to use a conductive agent of the same type as the conductive agent added to the positive electrode mixture layer 31, for example, a carbon material such as carbon black (CB), acetylene black (AB), Ketjen black, graphite, or the like. These may be used singly or in combinations of two or more thereof. The content of the conductive agent 34 is preferably 0.1 to 20% by volume and particularly preferably 1 to 10% by volume based on the total volume of the protective layer 32.

As the binder included in the protective layer 32, it is possible to use a binder of the same type as the binder applied in the positive electrode mixture layer 31, for example, a fluoro resin such as a polytetrafluoroethylene (PTFE) and polyvinylidene fluoride (PVdF), polyacrylonitrile (PAN), an polyimide resin, an acrylic resin, a polyolefin resin, or the like. These may be used singly or in combinations of two or more thereof. The content of the binder is preferably 0.1 to 20% by volume and particularly preferably 1 to 10% by volume based on the total volume of the protective layer 32.

The inorganic compound 33 may be particles made of an insulating inorganic compound and be embedded in the positive electrode current collector 30. Here, the insulating particles mean particles having a volume resistivity of $10^{12}$ Ω·cm or more as measured with a voltage application-type ohmmeter.

As the inorganic compound 33, it is preferred to use a compound having a lower oxidizing ability than that of the lithium metal composite oxide as the positive electrode active material. Examples of the inorganic compound 33 include inorganic compounds such as manganese oxide, silicon oxide (silica), titanium oxide (titania), and aluminum oxide (alumina), aluminum nitride, boron nitride, silicon nitride, and silicon carbide. Among these, an inorganic oxide is preferred, and aluminum oxide is particularly preferred.

The content of the inorganic compound 33 is at least 50% by volume, preferably 70 to 99% by volume, and more preferably 80 to 95% by volume based on the total volume of the protective layer 32. When the content of the inorganic compound 33 is within the range, the effect of suppressing a redox reaction is improved, and thus heat generation on an occurrence of an abnormality is easily suppressed.

The protective layer 32 includes secondary particles 33b formed by aggregation of primary particles 33a of the inorganic compound 33. Here, the primary particles 33a mean particle units among which no grain boundary is identified by observation with a scanning electron microscope (SEM) or a transmission electron microscope (TEM). The inorganic compound 33 is often present in a state of single primary particles 33a not aggregated with one another. The number of the primary particles 33a in a non-aggregated state is generally larger than the number of the primary particles 33a aggregated. The primary particles 33a aggregated are the secondary particles 33b, and the secondary particles 33b mean particle units among which grain boundaries are identified by an SEM or a TEM. In the protective layer 32, a large number of the primary particles 33a in non-aggregated state and a small number of the secondary particles 33b are present in admixture. It is considered that the secondary particles 33b facilitate formation of a conductive path in the protective layer 32, and thus, it is preferred that a small number of the secondary particles 33b be present in the protective layer 32.

The particle size of the primary particles 33a of the inorganic compound 33 (hereinbelow, sometimes referred to as the "primary particle size") is preferably 5 μm or less. It is preferable that no primary particles 33a having a particle size of more than 5 μm be present in the protective layer 32. The primary particle size can be measured by observation of a cross section of the protective layer 32 with an SEM or a TEM. The primary particle size is the maximum diameter length in the particle image. The primary particle size is more preferably 1 μm or less and particularly preferably 0.7 μm or less. The lower limit of the primary particle size is 0.01 μm, for example. The median value (median diameter) of the particle size of 100 primary particles 33a is 0.1 μm to 0.7 μm, for example.

The particle size of the secondary particles 33b of the inorganic compound 33 (hereinbelow, sometimes referred to as the "secondary particle size") is preferably 50 μm or less. It is preferred that no secondary particle 33b having a particle size of more than 50 μm be present in the protective layer 32. The secondary particle size can be determined by observing a cross section of the protective layer 32 with an optical microscope, SEM, or TEM and measuring the maximum diameter length in the particle image. The secondary particle size is more preferably 40 μm or less and particularly preferably 30 μm or less. The lower limit of the secondary particle size is 1 μm, for example.

The median value of the particle size of the secondary particles 33b of the inorganic compound 33 is 30 μm or less and preferably 20 μm or less. The preferred range of the median value may be, for example, 1 μm to 30 μm, 1 μm to 20 μm, 5 μm to 20 μm, or 10 μm to 20 μm. Application of the protective layer 32 including the secondary particles 33b having a median value of 30 μm or less and preferably 20 μm or less in the positive electrode 11 can remarkably suppress heat generation on an occurrence of an internal short circuit. The deviation of the secondary particle size is preferably 20 μm or less and more preferably 10 μm or less. 100 points randomly selected on the cross section of the protective layer 32 are observed, and the median value and deviation of the particle size of the secondary particles 33b are determined from the particle size of the secondary particles 33b present at the 100 points.

The median value and deviation of the particle size of the secondary particles 33b can be determined also by the following method.

From a positive electrode obtained by forming a protective layer on a positive electrode current collector and forming a positive electrode mixture layer on the protective layer, the positive electrode mixture layer on the protective layer is peeled off. This exposes the protective layer on the surface of the positive electrode current collector and on the surface of the positive electrode mixture layer.

The surface of the protective layer exposed on the surface of the positive electrode current collector and the surface of the protective layer exposed on the surface of the positive electrode mixture layer are observed using an optical microscope.

100 points randomly selected on each surface are observed, and the median value and deviation of the particle size of the secondary particles are determined from the particle size of the secondary particles present at the 100 points.

The numbers of the secondary particles 33b having the following particle sizes included in the protective layer 32 per unit area of 1 mm² of the positive electrode are as follows:

(1) 20 to 45 secondary particles 33b having a particle size of 5 μm to 15 μm,
(2) 30 to 55 secondary particles 33b having a particle size of 15 μm to 25 μm,
(3) 5 to 25 secondary particles 33b having a particle size of 25 μm to 35 μm, and
(4) 1 to 15 secondary particles 33b having a particle size of 35 μm to 45 μm.

The protective layer 32 may satisfy at least one of the conditions (1) to (4) or may be satisfy all the conditions.

The thickness of protective layer 32 is not particularly limited, and is preferably thinner than the thickness of the positive electrode current collector 30 and the positive electrode mixture layer 31. The thickness of the protective layer 32 is 0.5 μm to 50 μm, for example. The thickness of the thinnest portion of the protective layer 32 may be 0.5 μm and the thickness of the thickest portion thereof may be 50 μm. The thickness of the protective layer 32 is large at a portion where the secondary particles 33b are present. The upper limit of the thickness of the protective layer 32 is preferably 50 μm, more preferably 40 μm or less, and particularly preferably 30 μm or less. The lower limit of the thickness of the protective layer 32 is preferably 0.5 μm, more preferably 1 μm, and particularly preferably 2 μm.

The protective layer 32 can be formed by coating a slurry including the inorganic compound 33, the conductive agent 34, and a binder such as PVdF onto the positive electrode current collector 30. In other words, in the production process of the positive electrode 11, provided is the positive electrode current collector 30 on the surface of which the protective layer 32 is formed.

[Negative Electrode]

The negative electrode 12 comprises a negative electrode current collector and a negative electrode mixture layer formed on the current collector. A foil of a metal that is stable in the electric potential range of the negative electrode 12, such as copper, a film with such a metal disposed as an outer layer, and the like can be used for the negative electrode current collector. It is preferred that the negative electrode mixture layer preferably include a negative electrode active material and a binder and be formed on both sides of the negative electrode current collector. The negative electrode 12 can be produced by coating a negative electrode current collector with a negative electrode mixture slurry including a negative electrode active material, a binder, and the like, drying the coating, and rolling the coated current collector to form a negative electrode mixture layer on both sides of the negative electrode current collector.

The negative electrode active material is not particularly limited as long as being capable of reversibly intercalating and deintercalating lithium ions. Examples thereof that can be used include carbon materials such as natural graphite and artificial graphite, metals to be alloyed with Li such as Si and Sn, and metal compounds including Si or Sn. Examples of the metal compound include silicon compounds represented by $SiO_x$, where $0.5 \leq x \leq 1.6$ and silicon compounds represented by $Li_{2y}SiO_{(2+y)}$, where $0<y<2$. The negative electrode mixture layer may also include a lithium-titanium composite oxide as the negative electrode active material. When a lithium-titanium composite oxide is used, a conductive agent such as carbon black is preferably added to the negative electrode mixture layer.

As the binder included in the negative electrode mixture layer, a fluorine-containing resin such as PTFE and PVdF, PAN, polyimide, an acryl resin, polyolefin, styrene-butadiene rubber (SBR), or the like can be used. The negative electrode mixture layer may also include CMC or a salt thereof, polyacrylic acid (PAA) or a salt thereof, polyvinyl alcohol (PVA), or the like. The content of the binder is 0.1 to 10 parts by mass and preferably 0.5 to 5 parts by mass, for example, based on 100 parts by mass of the negative electrode active material.

[Separator]

An ion-permeable and insulating porous sheet is used as the separator 13. Specific examples of the porous sheet include a microporous thin film, woven fabric, and nonwoven fabric. Suitable examples of the material for the separator include polyolefins such as polyethylene and polypropylene, and cellulose. The separator 13 may have a single-layer structure or may have a layered structure. On the surface of the separator 13, a layer of a resin having high heat resistance such as an aramid resin may be formed.

On the interface between the separator 13 and at least one of the positive electrode 11 or the negative electrode 12, a filler layer including a filler of an inorganic material may be formed. Examples of the filler of an inorganic material include oxides and phosphoric acid compounds containing a metal such as Ti, Al, Si, or Mg. The filler layer can be formed by coating a slurry containing the filler onto the surface of the positive electrode 11, of the negative electrode 12, or of the separator 13.

[Electrolyte]

The electrolyte includes a solvent and an electrolyte salt dissolved in the solvent. As the electrolyte, a solid electrolyte also may be used. As the solvent, it is possible to use esters, ethers, nitriles such as acetonitrile, amides such as dimethylformamide, non-aqueous solvents such as mixed solvents of two or more of these non-aqueous solvents, and water, for example. The non-aqueous solvent may contain a halogen-substituted product formed by replacing at least one hydrogen atom of any of the above solvents with a halogen atom such as fluorine. Examples of the halogen-substituted product include fluorinated cyclic carbonate esters such as fluoroethylene carbonate (FEC), fluorinated chain carbonate esters, and fluorinated chain carboxylate esters such as methyl fluoropropionate (FMP).

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (where l and m are each an integer of 0 or more). These lithium salts may be used singly or two or more thereof may be mixed and used. Among these, $LiPF_6$ is preferably used in view of ionic conductivity, electrochemical stability, and other properties. The concentration of the lithium salt is, for example, 0.8 mol to 1.8 mol per 1 L of a solvent.

EXAMPLES

Hereinafter, the present disclosure will be further detailed by way of Examples, but the present disclosure is not limited thereby.

Example 1

[Production of Positive Electrode]

Aluminum oxide (an inorganic compound) particles of which primary particles have a median value of the particle size of 0.5 μm, PVdF and acetylene black (a conductive agent) were added into N-methyl-2-pyrrolidone (NMP) and stirred using a stirrer (manufactured by PRIMIX Corporation, FILMIX(R)) for two minutes to prepare a slurry for protective layer including the inorganic compound dispersed in NMP. The inorganic compound, the conductive agent, and PVdF were mixed at a mass ratio of 95.5:2.5:2.0. Then, both sides of a positive electrode current collector made of an aluminum foil having a thickness of 15 μm was coated with the slurry for protective layer to form protective layers each having an average thickness of 2 μm. The surface of the protective layers was observed using an optical microscope to measure the median value of the particle size of the secondary particles of the aluminum oxide and the deviation of the secondary particle size. The median value of the secondary particle size was 17.9 μm, and the deviation thereof was 8.2 μm.

Mixed were 97 parts by mass of a lithium metal composite oxide represented by $LiNi_{0.5}Co_{0.2}Mn_{0.3}O_2$ as the positive electrode active material, 2 parts by mass of acetylene black (AB), and 1 part by mass of PVdF, and an appropriate amount of NMP was added to the mixture to prepare a positive electrode mixture slurry. Then, both sides of the positive electrode current collector on each of which the protective layer was formed was coated with the positive electrode mixture slurry, and the coating was dried. The resulting product was cut to a predetermined electrode size, and the cut sample was rolled using a roller to produce a positive electrode in which the protective layer and the positive electrode mixture layer were formed in the order mentioned on both sides of the positive electrode current collector.

[Production of Negative Electrode]

Mixed were 98.7 parts by mass of a graphite powder, 0.7 parts by mass of carboxymethyl cellulose sodium (CMC-Na), and 0.6 parts by mass of a dispersion of styrene-butadiene rubber (SBR), and an appropriate amount of water was added to the mixture to prepare a negative electrode mixture slurry. Then, both sides of a negative electrode current collector made of a copper foil was coated with the negative electrode mixture slurry, and the coating was dried. The resulting product was cut to a predetermined electrode size, and the cut sample was rolled using a roller to produce a negative electrode in which a negative electrode mixture layer was formed on both sides of the negative electrode current collector.

[Preparation of Electrolyte]

Ethylene carbonate (EC), methyl ethyl carbonate (EMC), and dimethyl carbonate (DMC) were mixed at a volume ratio of 3:3:4. $LiPF_6$ was dissolved at a concentration of 1.2 mol/L in the mixed solvent to prepare a non-aqueous electrolyte.

[Production of Test Cell]

An aluminum lead was attached to the positive electrode described above, a nickel lead was attached to the negative electrode described above, and the electrodes were wound together with a separator made of polyethylene therebetween to produce an electrode assembly having a wound structure. The electrode assembly was housed in a bottomed cylindrical battery case having an outer diameter of 18 mm and a height of 65 mm, and the non-aqueous electrolyte was injected thereto. Then, the opening of the battery case was sealed with a gasket and a sealing assembly to produce a 18650-type cylindrical test cell having a rated capacity of 3100 mAh.

[Nail Driving Test]

The test cell produced was subject to a constant current charging at 0.3 C until the charge end voltage of 4.3 V and subjected to a constant voltage charging at 4.3 V until the current value reached 0.05 C. Under an environment of 25° C., a round nail was driven in the center of the side of the charged test cell. When the round nail completely penetrated through the cell, the driving was stopped, and the exothermic temperature was measured. The evaluation results are shown in Table 1.

[Measurement of Thickness of Positive Electrode Mixture Layer]

A cross section of the positive electrode was observed using an SEM to measure the maximum value and minimum value of the thickness of the positive electrode mixture layer. The ratio of the maximum value to the minimum value (maximum value/minimum value) is shown in Table 1.

Example 2

A test cell was produced and subjected to the evaluation described above in the same manner as in Example 1 except that aluminum oxide particles, acetylene black, and PVdF were added in NMP and that the mixture was stirred using a FILMIX for one minute in the preparation of the slurry for protective layer.

Comparative Example 1

A test cell was produced and subjected to the evaluation described above in the same manner as in Example 1 except that stirring using a FILMIX was not performed in the preparation of the slurry for protective layer.

TABLE 1

| | Median value of secondary particle size | Deviation of secondary particle size | Exothermic temperature | Positive electrode mixture layer Maximum value/minimum value |
|---|---|---|---|---|
| Example 1 | 17.9 µm | 8.2 µm | 25.6° C. | 1.6 |
| Example 2 | 22.9 µm | 16.6 µm | 50.6° C. | 2.2 |
| Comparative Example 1 | 38.6 µm | 32.5 µm | 99.1° C. | 3.9 |

As shown in Table 1, both the test cells of Examples each exhibited a lower exothermic temperature in the nail driving test than that of the test cell of Comparative Example. Particularly, in the test cell of Example 1, heat generation on an occurrence of an internal short circuit is remarkably suppressed in comparison with the test cell of Comparative Example 1. Additionally, the test cells of Examples have smaller variations in the thickness of the positive electrode mixture layers than that of the test cell of Comparative Example. It is considered that the variations in the thickness of the positive electrode mixture layers are significantly influenced by the variations in the thickness of the protective layers. That is, in the test cells of Examples, the variations in the thickness of the protective layers are smaller and the thickness of the protective layers is more uniform, in comparison with the test cell of Comparative Example. Suppression of variations in the thickness of the positive electrode mixture layers is expected to allow the charge/discharge reaction in the positive electrode and the negative electrode to be more homogeneous.

REFERENCE SIGNS LIST 10 secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 positive electrode current collector
31 positive electrode mixture layer
32 protective layer
33 inorganic compound
33a primary particle
33b secondary particle
34 conductive agent

The invention claimed is:

1. A positive electrode for a secondary battery comprising:
   a positive electrode current collector,
   a positive electrode mixture layer formed on at least one side of the positive electrode current collector, and
   a protective layer including an insulating inorganic compound and a conductive agent, the protective layer being interposed between the positive electrode current collector and the positive electrode mixture layer, wherein
   the protective layer includes secondary particles formed by aggregation of primary particles of the inorganic compound,
   a median value of a particle size of the secondary particles is 30 µm or less, and
   a content of the inorganic compound is at least 50% by volume based on a total volume of the protective layer.

2. The positive electrode for a secondary battery according to claim 1, wherein a median value of the particle size of the secondary particles is 1 µm to 30 µm.

3. The positive electrode for a secondary battery according to claim 1, wherein a thickness of the protective layer is 0.5 µm to 50 µm.

4. The positive electrode for a secondary battery according to claim 1, wherein a particle size of the primary particles is 5 µm or less.

5. The positive electrode for a secondary battery according to claim 1, wherein a particle size of the secondary particles is 50 µm or less.

6. The positive electrode for a secondary battery according to claim 1, wherein a deviation of the particle size of the secondary particles is 10 µm or less.

7. The positive electrode for a secondary battery according to claim 1, wherein the protective layer satisfies at least one condition of (1) to (4) below:
   (1) 20 to 45 secondary particles having a particle size of 5 µm to 15 µm are included,
   (2) 30 to 55 secondary particles having a particle size of 15 µm to 25 µm are included,
   (3) 5 to 25 secondary particles having a particle size of 25 µm to 35 µm are included, and
   (4) 1 to 15 secondary particles having a particle size of 35 µm to 45 µm are included, per unit area of 1 mm$^2$ of the positive electrode.

8. A positive electrode current collector for a secondary battery, comprising a protective layer formed on a surface thereof, the protective layer including an insulating inorganic compound and a conductive agent, wherein
   the protective layer includes secondary particles formed by aggregation of primary particles of the inorganic compound,
   a median value of a particle size of the secondary particles is 30 µm or less, and
   a content of the inorganic compound is at least 50% by volume based on a total volume of the protective layer.

9. A secondary battery, comprising:
   the positive electrode for a secondary battery according to claim 1;
   a negative electrode; and
   an electrolyte.

10. The positive electrode for a secondary battery according to claim 1, wherein the protective layer contains a binder in an amount of 0.1 to 20% by volume based on the total volume of the protective layer.

11. The positive electrode current collector for a secondary battery according to claim 8, wherein the protective layer contains a binder in an amount of 0.1 to 20% by volume based on the total volume of the protective layer.

* * * * *